United States Patent
Knight et al.

(10) Patent No.: US 12,198,148 B2
(45) Date of Patent: Jan. 14, 2025

(54) MONITORING CARBON EMISSIONS OF COMPUTING PROCESSES RUNNING ON A CONTAINER ORCHESTRATION PLATFORM

(71) Applicant: Microsoft Technology Licensing, LLC, Redmond, WA (US)

(72) Inventors: Vaughan Shields Knight, Sydney (AU); Jason Daniel Gerald Goodsell, Melbourne (AU); Yassine El Ghali, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 17/839,541

(22) Filed: Jun. 14, 2022

(65) Prior Publication Data

US 2023/0401585 A1 Dec. 14, 2023

(51) Int. Cl.
*G06Q 30/00* (2023.01)
*G06F 9/455* (2018.01)
*G06F 11/30* (2006.01)
*G06Q 30/018* (2023.01)

(52) U.S. Cl.
CPC ....... *G06Q 30/018* (2013.01); *G06F 9/45558* (2013.01); *G06F 11/3062* (2013.01); *G06F 2009/45595* (2013.01)

(58) Field of Classification Search
None
See application file for complete search history.

(56) References Cited

U.S. PATENT DOCUMENTS

| 2010/0211941 A1* | 8/2010 | Roseborough ............ G06F 8/65 717/170 |
| 2012/0271677 A1* | 10/2012 | Rhodes, III ............ G06Q 10/06 705/7.27 |
| 2014/0180726 A1* | 6/2014 | Lavie ..................... G06Q 40/08 705/4 |
| 2021/0373973 A1 | 12/2021 | Ekins et al. |

(Continued)

OTHER PUBLICATIONS

Ant Group Achieves Carbon Neutrality in Its Own Operations With Green Computing Technologies Driving Indirect Emission Cuts. Publication info: St. Joseph News—Press [St. Joseph, Mo] Apr. 19, 2022. (Year: 2022).*

(Continued)

*Primary Examiner* — Matthew T Sittner (57) ABSTRACT

A computing system measures an amount of carbon that is emitted as a consequence of the execution of individual application processes of an operation. The computing system can then leverage these measurements to modify how the application processes are run. In operation, the computing system deploys an application process in a container of a particular worker node of a cluster in a container orchestration platform. The technology further deploys an agent (e.g., a daemon) on all of the worker nodes of the cluster, including the particular worker node. The agent includes an energy-managing mechanism that is given privileges to measure the amount of energy consumed by the application process within the particular node. The computing system can use this energy measure, together with applicable carbon intensity information, to compute the amount of carbon emitted by the application process.

17 Claims, 7 Drawing Sheets

(56) References Cited

U.S. PATENT DOCUMENTS

2023/0161631 A1* 5/2023 Sharma ............... G06F 9/4856 718/104
2023/0315695 A1* 10/2023 Pathan ............... G06F 16/178 707/821

OTHER PUBLICATIONS

ZF Aftermarket's training program in 2022: more comprehensive than ever before. Publication info: News Bites—Private Companies [Melbourne] Feb. 17, 2022. (Year: 2022).*

Urban Decarbonization: Politics and Practices of Carbon Neutrality. Author: Tozer, Laura. Publication info: University of Toronto (Canada). ProQuest Dissertation & Theses, 2018. (Year: 2018).*

Saboor, et al., "Enabling rank-based distribution of microservices among containers for green cloud computing environment," in Peer-to-Peer Networking and Applications, vol. 15, No. 1, Aug. 18, 2021, pp. 77-91.

PCT Search Report and Written Opinion for PCT/US2023/019535, date of mailing: Aug. 1, 2023 (received by undersigned Jul. 28, 2023), 14 pages.

"The Linux PowerTOP tool," available at https://github.com/fenrus75/powertop, GitHub, accessed on Jun. 2, 2022, 6 pages.

Bergman, Sara, "How to measure the power consumption of yourbackend service," available at https://devblogs.microsoft.com/sustainable-software/how-to-measure-the-power-consumption-of-your-backend-service/?WT.mc_id=green-8247-cxa, Microsoft Sustainable Development, Sep. 21, 2020, 5 pages.

Chamberlin, Scott, "Measuring Your Application Power and Carbon Impact (Part 1)," available at https://devblogs.microsoft.com/sustainable-software/measuring-your-application-power-and-carbon-impact-part-1/?WT.mc_id=green-8660-cxa, Microsoft Sustainable Development, Sep. 14, 2020, 5 pages.

"PowerTOP," available at https://en.wikipedia.org/wiki/PowerTOP, Wikipedia article, accessed on May 31, 2022, 2 pages.

Accardi, et al., "Powertop User's Guide," available at https://01.org/sites/default/files/page/powertop_users_guide_201412.pdf, Intel Corporation, Palo Alto, California, accessed on Jun. 3, 2022, 10 pages.

"Grafana Enterprise Metrics," available at https://grafana.com/products/enterprise/metrics/, Grafana Labs, New York, New York, accessed on Jun. 6, 2022, 16 pages.

"Introduction to Azure Kubernetes Service—Azure Kubernetes Service," available at https://docs.microsoft.com/en-us/azure/aks/intro-kubernetes, Microsoft Azure, accessed on Jun. 3, 2022, 7 pages.

"ElectricityMap," available at https://electricitymap.org, electricityMap, Copenhagen, Denmark, accessed on Jun. 4, 2022, 8 pages.

"Docker (software)," available at https://en.wikipedia.org/wiki/Docker_(software), Wikipedia article, accessed on Jun. 3, 2022, 8 pages.

"About WattTime," available at https://www.watttime.org/about/, WattTime, Oakland, CA, accessed on Jun. 4, 2022, 4 pages.

"Logging Architecture," available at https://kubernetes.io/docs/concepts/cluster-administration/logging/, Kubernetes, The Linux Foundation, accessed on Jun. 3, 2022, 8 pages.

"Data driven solutions, empowering the clean energy economy," available at https://resurety.com/, REsurety, Boston, Massachusetts, accessed on Jun. 6, 2022, 8 pages.

"Grafana Cloud, Your observability, managed as a service," available at https://grafana.com/products/cloud/, Grafana Labs, New York, New York, accessed on Jun. 4, 2022, 8 pages.

"Labels and Selectors," available at https://kubernetes.io/docs/concepts/overview/working-with-objects/labels/, Kubernetes, The Linux Foundation, Jul. 1, 2021, 5 pages.

Goltsman, Kirill, "Cluster-level Logging in Kubernetes with Fluentd," available at https://medium.com/kubernetes-tutorials/cluster-level-logging-in-kubernetes-with-fluentd-e59aa2b6093a, Medium, Feb. 12, 2019, 16 pages.

Ahmed, Mohamed, "Kubernetes DaemonSets 101," available at https://www.magalix.com/blog/kubernetes-daemonsets-101, SaC Newsletter Magalix, Corporation, Aug. 7, 2019, 16 pages.

"Prometheus (software)," available at https://en.wikipedia.org/wiki/Prometheus_(software), Wikipedia article, accessed on Jun. 5, 2022, 6 pages.

* cited by examiner

| | Process X | Process Y | Cluster | Entire App | etc. |
|---|---|---|---|---|---|
| Energy | | | | | |
| C.I. | | | | | |
| Carbon | | | | | |

OVERVIEW OF THE ROLE OF APPLICATION DESIGNATION INFORMATION
902

DETERMINE THAT THE APPLICATION LOGIC HAS BEEN DESIGNATED BY APPLICATION DESIGNATION INFORMATION TO INDICATE THAT CARBON EMISSION INFORMATION IS TO BE PROVIDED FOR THE APPLICATION LOGIC.
904

⋮

SELECTIVELY GENERATE A CARBON EMISSION ASSESSMENT FOR THE APPLICATION LOGIC BASED ON THE ENERGY ASSESSMENT, THE CARBON INTENSITY ASSESSMENT, AND THE APPLICATION DESIGNATION INFORMATION.
906

MONITORING CARBON EMISSIONS OF COMPUTING PROCESSES RUNNING ON A CONTAINER ORCHESTRATION PLATFORM

BACKGROUND

Computing processes may be responsible for releasing carbon dioxide into the atmosphere insofar as the production of electricity that is used to power the computing processes emits carbon dioxide. Individual and business entities are often keenly interested in discovering the precise extent of this nexus. For instance, a business entity may incur sizable government fines for directly or indirectly burning a large amount of fossil fuels in the running of its operations. Further, a business entity that fails to embrace "green" practices may fall into disfavor among its customers, who are becoming increasing aware of the importance of reducing greenhouse gases. In yet other cases, a business entity may operate in a carbon trading environment. Here, the business entity can reduce its operating costs by reducing the need to purchase carbon credits in the carbon market. In other cases, the business entity that can prove it has a low carbon footprint may be in a position to sell carbon credits into the carbon market.

Unfortunately, an entity lacks good solutions for accurately determining the amount carbon dioxide that is emitted by their data processing operations. The entity can sometimes make rough approximations of its carbon footprint. For instance, in some cases, a data center operator may be able to inform the entity of the amount of energy that is consumed in running servers dedicated to the entity's software systems. The data center operator can also give the customer a general idea of the carbon footprint of its overall operations. For example, a data center that runs in Chelan Country in Washington State (USA) has a carbon intensity of 24 grams CO2 eq/kwh (carbon dioxide emission equivalent per kilowatt-hour) because it primarily draws power from nearby hydroelectric facilities on the Columbia River. In contrast, a data center that runs in parts of Montana (USA), about 500 miles east of Chelan Country, has a carbon intensity of 637 CO2 eq/kwh. This relatively high reading is caused by the fact that over 70 percent of the available electricity in this region is produced by burning coal. These types of measures may give the user a rough idea of whether their operations are "green," yet may be insufficient to constitute proof to relevant authorities. These measures may further lack specific guidance as to how an entity can improve its practices, especially in those cases in which it is impractical for the entity to uproot its entire operations and move elsewhere.

SUMMARY

A computing system is described herein for measuring an amount of carbon dioxide that is emitted as a consequence of the execution of individual application processes of an operation. The computing system can then leverage these measurements to modify how the application processes are run. For instance, the computing system can make allocation decisions based on the measurements. In other cases, the computing system can modify the application processes to improve their carbon footprint.

In some implementations, the computing system deploys an application process in a container of at least one worker node of a cluster in a container orchestration platform. The computing system further deploys an agent (e.g., a daemon) on each worker node of the cluster. Each instance of the agent running on each particular node includes an energy-managing mechanism that is given privileges to measure the amount of energy consumed by the application process within the particular node. The computing system can use this energy measure, together with applicable carbon intensity information, to compute the amount of carbon dioxide emitted by the application process. Scaling up, the computing system can then derive a high-confidence measure of the carbon footprint of an entire application that runs in a cloud computing environment.

Further, a cloud computing provider can provide the above carbon monitoring capability to a customer without causing significant changes to its software development practices. The customer need only tag the application processes for which it desires carbon emission measures. The cloud computing provider can thereafter manage the deployment of agents on the customer's nodes and cluster(s). The computing system will thereafter provide carbon emission measurements for only those application processes that have been tagged.

Further still, the above-summarized solution is scalable because it can be applied to a wide variety of application code, even those instances of application code considered "legacy" applications. This is because the application code that runs inside a container orchestration platform is containerized. The agent interacts with the container (or, more precisely, a pod that wraps the container), rather than directly interacting with the application code. A developer need not make changes to the application code to expose its operations to the agent. Again, the developer is only asked to designate those application processes for which carbon emission data is desired.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for computing and acting on per-application-process carbon dioxide emission information. For brevity, "carbon dioxide emission" is shortened in the explanation below to "carbon emission." Section B sets forth illustrative methods that explain the operation of the computing system of Section A. And Section C describes illustrative computing functionality that can be used to implement any aspect of the features described in Sections A and B. In the following, a power measure refers to a rate at which energy is used or consumed, e.g., measured in watts. Energy measures work performed, e.g., measured in Joules or watt-time units. The energy consumption of an entire process expressed by a particular energy measure can be determined by multiplying the power of a process by its duration.

A. Illustrative Computing System

Figure 1:
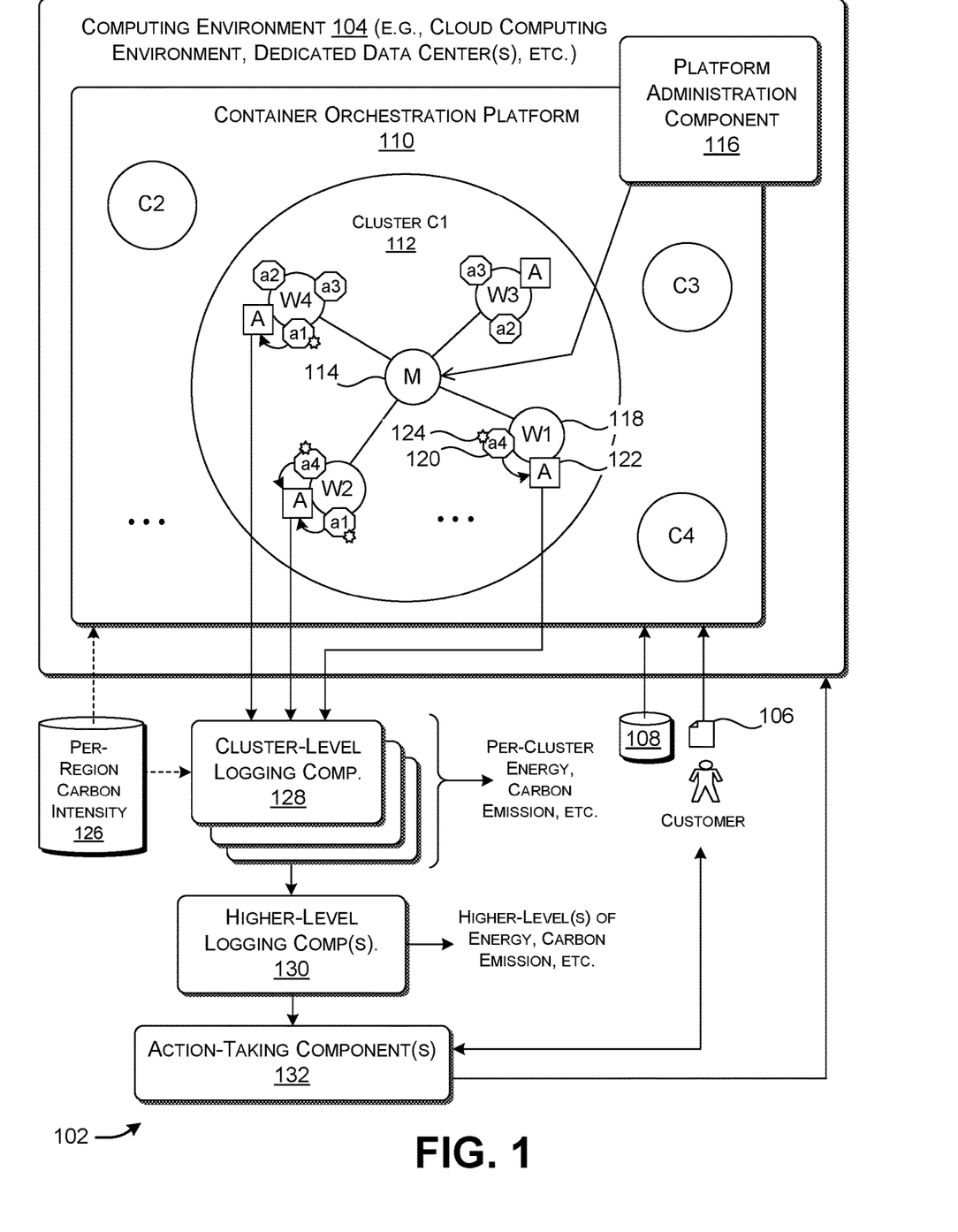
FIG. 1 shows an illustrative computing system for measuring carbon emission of application processes.

FIG. 1 shows an overview of a computing system 102 for running applications. The computing system 102 executes the applications in a computing environment 104. The computing environment 104 may include one or more dedicated data centers maintained by any type of entities(s) for exclusively use by the entities(s). Alternatively, the computing environment 104 may use a shared cloud computing environment that is available for use by members of the public, e.g., free of charge or upon paying a fee proportional to the amount of resources that are being used. Without limitation, the person who interacts with the computing environment 104 is referred to as "customer." That person may represent an employee of an organization, a member of the general public, etc.

The customer submits an application manifest 106 that declaratively specifies what application he or she wishes to run on the resources of the computing environment 104. The application manifest 106 also supplies a number of parameters that govern how the application is to be deployed in the computing environment 104. The application manifest 106 also specifies the location at which the image of the application can be found. FIG. 1 specifically illustrates a case in which the image of the application is found in a data store 108. The customer may express the application manifest 106 in any data-serialization language, such as YAML, JSON, etc.

In some cases, the application described by the application manifest 106 implements an entire service. In other cases, the application described in the application manifest 106 describes one part of a program that has plural parts. Assume that, in the example of FIG. 1, the application has a name "a4." Further assume that the customer has previously deployed applications "a1," "a2," and "a3" in the computing environment 104. These four applications may correspond to a suite of related programs that perform a particular service, such as an online shopping service.

In response to receiving the customer's application manifest 106, the computing environment 104 deploys the application in a container orchestration platform 110. A container bundles the code of an application, together with any configuration files, data, libraries, etc. that are needed to run the application, in a single package. Packaging the application into a self-contained software unit in this manner makes it convenient to quickly transfer the application from one platform to another. This strategy also allows operations to be performed on software units (e.g., the containers) without regard to the particular programming characteristics of the application itself. The container orchestration platform 110 performs the specific task of assigning the application to computing nodes ("worker nodes"), and then managing the application's execution in the container orchestration platform 110.

In the specific examples set forth below, the container orchestration platform 110 uses a Kubernetes service, such as the Azure Kubernetes Service (AKS) provided by Microsoft Corporation of Redmond, Washington. However, the container orchestration platform 110 can run on any type of container orchestration system, such as Docker Swarm provided by Docker, Inc. of Palo Alto California, Apache Mesos produced by Apache Software Foundation, Nomad produced by HashiCorp of San Francisco, California, and so on. In still other cases, the container orchestration platform 110 uses a custom system. Hence, the description of Kubernetes or Kubernetes-like features below is to be interpreted as provided non-limiting examples of how the container orchestration platform 110 may be implemented, rather than setting forth architectural constraints.

The container orchestration platform 110 deploys the application a4 on two worker nodes (W1, W2) of a cluster C1 112 having at least one master node 114 and plural worker nodes (W1, W2, W3, W4, etc.). More specifically, the container orchestration platform 110 deploys the application a4 on two worker nodes because the application manifest 106 specifies that two replicas of the application a4 are required. The container orchestration platform 110 uses a scheduler (described below) to determine the specific nodes on which a new application is to be deployed. Although not shown, some implementations of the container orchestration platform 110 use plural redundant master nodes. When one master node fails, the platform orchestration platform 110 can substitute one of the master nodes that remains running. Although the simplified cluster 112 includes only five nodes, an actual cluster may accommodate many more worker nodes (e.g., up to 5,000 nodes in Kubernetes).

The nodes may correspond to physical or virtual computing machines. The master node 114 governs the operation of the worker nodes based on the instructions in the application manifest 106 and feedback from the worker nodes. The worker nodes run the customer's applications in container runtimes. The master node 114 is managed by a platform administration component 116 on behalf of the customer. In some implementations, the customer is not permitted to deploy programs on the master node 114. In other cases, however, the customer is given rights to deploy resources on the master node 114. FIG. 1 also shows that the container orchestration platform 110 hosts many other clusters (C2, C3, C4, etc.). These other clusters may run applications associated with other customers.

Consider the illustrative makeup of the first worker node W1 (118). The node runs a single application "a4" 120 in a container (not shown). The node also hosts an agent "A" 122 that is configured to perform the dedicated task of measuring the energy consumption and carbon emissions of any application running on the worker node W1 (118) that has been designated of interest, on the basis of application designation information. Here, the application designation information, which may be specified via the application manifest 106 via annotations, labels, etc., specifies that the application "a4" 120 is a resource that is to be monitored by the agent "A" 122. A star 124 symbolizes the fact that the application "a4" 120 has been tagged to indicate that the agent 122 should measure its energy consumption. Node W2 runs two applications "a1" and "a4", both of which have been previously tagged. Accordingly, the agent that runs on the node W2 measures the energy consumption for both of these applications. In contrast, node W3 runs application "a2" and "a3," neither of which have been previously tagged. Hence, the agent that runs on this node W3 does not monitor the energy consumption of any application that it runs. Node W4 runs three applications "a1," "a2," and "a3," but only monitors the energy consumption of application "a1." Again, this is because only application "a1" has been previously tagged.

In some implementations, each agent performs the follow-on task of determining a carbon emission measure C for each tagged application. The carbon emission measure C reflects an amount of carbon dioxide (e.g., in grams) released into the atmosphere due to the execution of an application. The agent computes the carbon emission measure C by multiplying the energy consumption E of the application (e.g., measured in kilowatt hour (kwh)), which has been measured by the agent, by a carbon intensity measure I (e.g., measured in grams of carbon dioxide equivalent per kilowatt hour (gCO2 eq/kwh)). In other words, $C=E*I$. In other cases, the agent provides just the energy consumption measure to a downstream component, such as a cluster-level logging component 128. In that case, the downstream component computes the carbon measure using the above formula. In either case, the application designation information specified in the application manifest 106 ultimately designates the applications for which carbon emission information is to be determined.

Each agent receives an energy measure from an energy-measuring mechanism, such as, without limitation, Power-TOP produced by Intel Corporation of Palo Alto, California (USA). The application manifest 106 includes parameters that give the energy-measuring mechanism privileged access to the tagged applications. In one non-limiting implementation, an energy-monitoring mechanism can measure the amounts of energy consumed by the hardware that implements an application for different types of elemental operations, such as particular CPU operations, memory fetch operations, etc. This can be determined in various ways. Without limitation, in an event-count approach, an energy-monitoring mechanism can determine the current (I) or voltage (V) and time (t) used to perform each elemental operation (e.g., $energy=I*V*t=I^2R*t=V^2*t/R$, where R is resistance) in different power states of operation, or can consult a reference source that provides previously-measured energy measures for the elemental operations. The energy-monitoring mechanism can then observe how many of those operations are performed in executing the application process. Multiplying these two measures yields the amount of energy consumed by the application process. Overall, note that the specific methods used to collect the lowest-level energy measures will depend on the various ways that device manufacturers choose to expose this information to monitoring agents. The PowerTOP mechanism monitors device driver operations, kernel operations, program operations, etc. for Linux-based operating systems for a select class of processors (e.g., Intel, ARM, AMD, etc.). The principles set forth herein are not limited to any specific mechanism for determining the lowest-level energy readings. For example, it is also possible to assess energy consumed by a computing operation using thermal sensors, etc.

The agent (or downstream component) receives the carbon intensity measure I from a data store 126 that provides carbon intensity measures for different geographic regions. In operation, the data store 126 provides appropriate carbon intensity information by mapping location information that describes the location of computations performed by the cluster C1 (112) to a carbon intensity measure associated with that location. Location can be specified in any manner, e.g., by specifying a zip code, GPS coordinates, a city, a county, a state, a country, an identifier associated with a utility company, and so on.

Any energy source has overall environmental and societal consequences that are complex and multi-factored. Limiting the focus here to the carbon emissions produced by running operations, it is generally true that the carbon intensity of a region depends on the manner in which electricity is produced in the region. Burning coal is among the dirtiest sources of electricity (having a high carbon intensity measure), while hydroelectric power, wind power, and solar power are among the cleanest forms of energy (having low carbon intensity measures). The operation of nuclear energy plants also has relatively low carbon emissions. The stability of the carbon intensity measure associated with a region likewise varies. A region that exclusively uses coal to make electricity will have a consistently poor carbon intensity measure. A region that mixes renewable energy sources with coal will have a carbon intensity measure that varies depending on the amount of renewable energy available at any given time (or season). For example, the Scablands of Washington state consistently exhibits more average cloud cover in the fall and winter months compared to other times of the year. Examples of existing providers of carbon intensity information are: electricityMap of Copenhagen, Denmark, WattTime of Oakland, California (USA), and REsurety of Boston, Massachusetts (USA).

The cluster-level logging component 128 collects measurements made by each cluster of the container orchestration platform 110 to provide per-cluster energy measures. For instance, for cluster C1 (112), the cluster-level logging component 128 can compute how much energy is consumed and carbon is emitted by each individual tagged application in the cluster. It can also compute these measures for all of the tagged applications in the cluster in aggregate. One or more higher-level logging components 130 provides energy consumption and carbon emission information of a more general nature. For example, the higher-level logging component(s) 130 can compute the amount of energy consumed and carbon emitted by all clusters associated with a customer, an entire industry, a state, etc. FIG. 1 illustrates the cluster-level logging component 128 and the higher-level logging component(s) 130 as separate elements only to facilitate explanation; alternatively, the logging functions described above can be performed by a single logging component.

The architecture and carbon-logging protocol described above has the advantage of providing carbon emission information on the level of individual application processes, if needed. It further provides emission measures having a high-degree of confidence, since the readings originate from relatively low levels of program execution in the computing environment 104, e.g., compared to assessing the energy consumption of the computing environment 104 as a whole and working backward to approximate how individual processes may contribute to the total energy consumption. Further still, the architecture provides a way of measuring carbon emissions of an application without reconfiguring the application code itself to expose its consumption characteristics, or providing ad hoc solutions that tap into specific signals produced by the application code. The customer need only designate those application processes for which carbon emission information is desired. Further technical advantages of the above solution are set forth below.

One or more action-taking components 132 perform actions based on the carbon emission information produced by the computing system 102. One action-taking component provides a visualization of the carbon emission information produced by the computing system 102, e.g., using a tabular presentation, a graphical presentation, an interactive graphical presentation, and so on. Another action-taking component decides where to run an application based on the application emission information. Another action-taking component makes one or more changes to application code based on the carbon emission information. Further details regarding the action-taking component(s) 132 will be set forth below in the context of the explanation of FIGS. 4-7.

Figure 2:
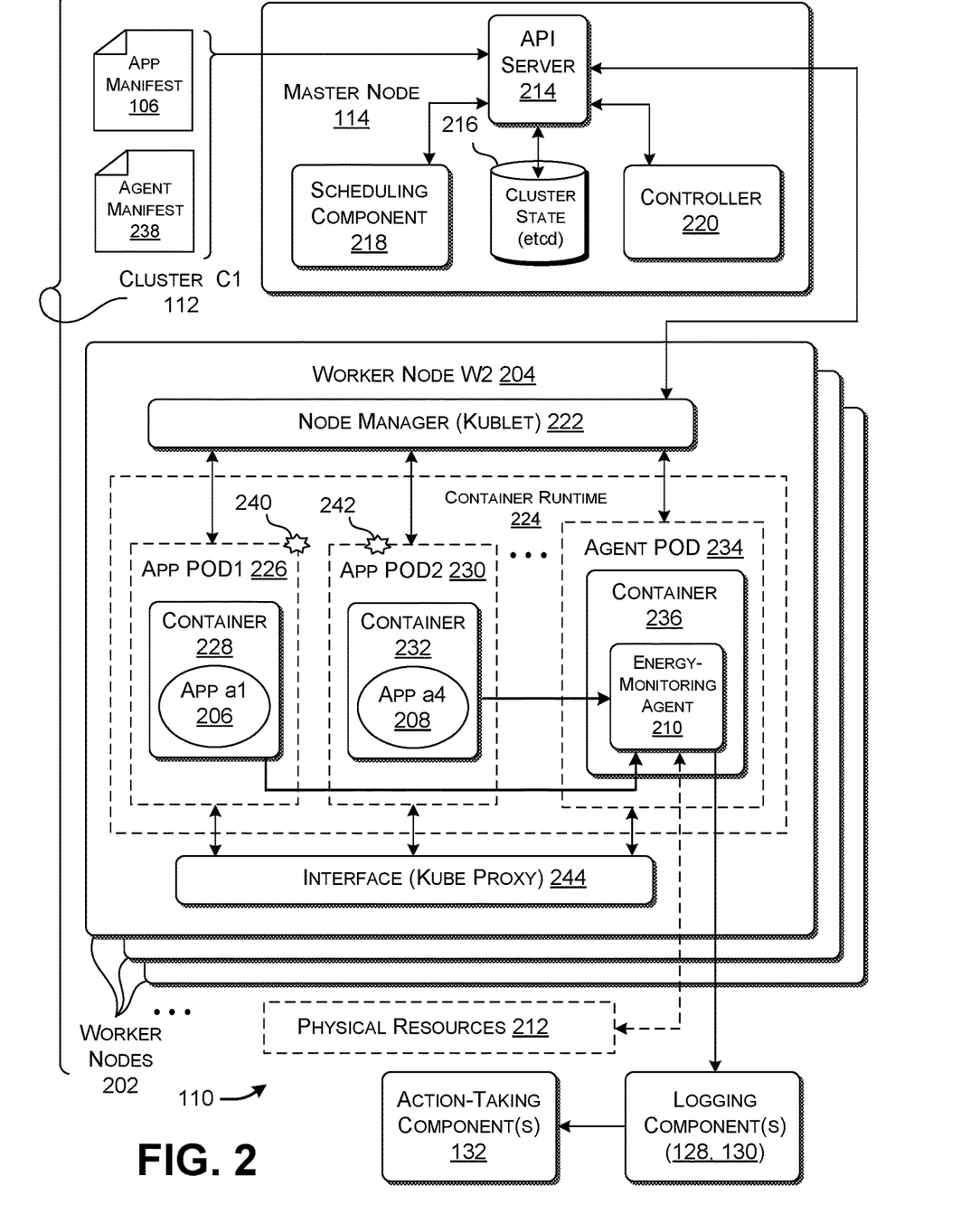
FIG. 2 shows one implementation of a container orchestration platform, which is one component of the computing system of FIG. 1.

FIG. 2 shows one implementation of the container orchestration platform 110 introduced in FIG. 1. FIG. 2 specifically highlights the manner in which the container orchestration platform 110 implements the cluster C1 (112) having master node 114 and worker nodes (W1, W2, W3, W4, etc.), collectively referred to as worker nodes 202. Yet more specifically, FIG. 2 focuses on the implementation of the illustrative worker node W2 (204) that hosts applications "a1" 206 and "a4" 208 and energy-monitoring agent 210 ("agent" for brevity). The other worker nodes 202 have a similar architecture and execute a similar protocol as the illustrative node worker W2 (204). As noted above, the nodes may represent physical machines (e.g., physical servers) or virtual machines. More generally, the nodes use physical resources 212 of the computing environment 104, described more fully in the context of FIG. 11. Generally, these physical resources 212 include processors, memory, storage devices, communication resources, etc. The physical resources 212 can be distributed over one or more sites of any geographic scope.

FIG. 2 will generally be described in top-down fashion. Starting with the master node 114, this element includes an API (application programming interface) server 214. The API server 214 is the main gateway that allows the customer or other authorized entity to access the cluster 112 via APIs (although end users generally directly interact with the applications running on the worker nodes 202, e.g., via network interface functionality, load balancer functionality, etc. described below). The API server 214 also interacts with the worker nodes 202.

A data store 216 holds the current state of the cluster C1 (112), e.g., by specifying the worker nodes 202 in the cluster C1 (112) and the applications running on each node. The data store 216 also stores the namespaces associated with the running applications. Upon receiving the application manifest 106, the master node 114 updates the cluster state to reflect a new desired configuration of the cluster C1 (112). In the Kubernetes framework, the data store 216 is implemented as a key-value store, referred to as the "etcd" store.

The data store 216 is useful to enable recovery of the cluster state upon the failure of part of the cluster C1 (112).

A scheduling component 218 determines the nodes on which applications are to be run. Thus, upon receiving the application manifest 106 for application "a4" 208, and specifying a replication variable of two, the scheduling component 218 will determine which two nodes of the plurality of worker nodes 202 are to run the application "a4." The scheduling component 218 makes this decision by matching the requirements of the application with the available worker nodes. The scheduling component 218 will also consider the existing workloads and other resource constraints or limitations of individual worker nodes. In operation, the scheduling component 218 regularly pings the API server 214 to determine whether there is any outstanding work for it to perform.

A controller 220 monitors what is happening across the cluster C1 (112). The controller 220 delegates its control operations to plural sub-controllers (not shown), each of which performs a specific control task. For example, a node controller determines when any node has failed and corrective action is to be taken. A replication controller ensures that the required number of application instances are running in the cluster C1 (112), and so on.

Now referring to the illustrative worker node W2 (204), a node manager 222 ("Kublet" in Kubernetes jargon) ensures that processes of the worker node W2 (204) are running as expected. It further receives instructions from the master node 114 via the API server 214. Based on those instructions, the node manager 222 assigns and removes workloads in the worker node W2 (204). The node manager 222 also monitors the state of the worker node W2 (204) to ensure that it is running as expected, and sends status information back to the master node 114.

A container runtime 224 provides a service for running containers. The container orchestration platform 110 can make use of any container runtime 224, a common choice at the present time being the container runtime provided by Docker, Inc. of Palo Alto, California. As noted above, a container itself is a self-contained executable bundle of logic that includes the application code to be run together with any of its dependencies. The container orchestration platform 110 does not directly interact with containers, however. Rather, it interacts with pods, which are elemental software units that abstract and wrap the containers. This added software abstraction layer enables the container orchestration platform 110 to interact with different container formats in an application-agnostic manner.

In the specific non-limiting example of FIG. 2, a first application pod (POD1) 226 contains a container 228, which contains the application "a1" 206. A second application pod (POD2) 230 contains a container 232, which contains the application "a4" 208. A third pod (agent POD) 234 provides a container 236, which contains the agent 210. Each pod operates using its own namespace. Although not shown, the pods are associated with static service addresses that enable them to interact with each other. Also not shown, any pod can include two or more containers. However, a pod typically includes a single container, or a container that hosts a main application and a container that hosts an application that performs a support or helper function with respect to a main application.

Pods are ephemeral objects. The master node 114 will work in cooperation with each node manager 222 to create a new instance of a pod if a current instance is determined to have failed. For instance, the node manager 222 may attempt to restart a pod that has failed on the worker node W2 (204) if possible. If not possible, the master node 114 may instruct another node to create the required instance of the pod. The container orchestration platform 110 treats pods that implement instances of the agent 210 differently than pods that implement applications. That is, the container orchestration platform 110 will ensure that each node runs a single pod that implements an instance of the agent 210. If the pod that implements the agent 210 fails, the container orchestration platform 110 will restore it on the worker node W2 (204), as it is a requirement that all nodes run instances of the agent.

In the non-limiting context of Kubernetes, each instance of the agent 210 can be implemented as a software daemon. The master node 114 can create and manage a set of daemon instances running on different worker nodes 202 using a DaemonSet. The container orchestration platform 110 performs this task, in turn, using an agent manifest 238. The agent manifest 238 declaratively specifies the characteristics of the agent 210. For example, the agent manifest 238 specifies an image of the code that will implement the agent 210. The agent manifest 238 can also specify that the agent is to be given privileged access to tagged applications. The customer, in turn, can identify the tagged applications via application designation information provided in the application manifest 106. While the customer may give tacit approval for the deployment of agents on its worker nodes 202 by tagging the applications to be monitored, the customer need not be tasked with the responsibility of creating the agent manifest 238; this is the job of the platform administration component 116. In other implementations, the customer can create a custom agent by submitting a custom agent manifest 238.

FIG. 2 annotates pods 226 and 230 with star symbols (240, 242) to indicate that these the applications (206, 208) that run in these pods (226, 230) have been tagged. Although not shown, the worker node W2 (204) can deploy at least one pod that is not tagged. In other cases, the worker node W2 (204) may deploy no pods that are tagged. As stated above, the computing system 102 is configured to only provide carbon emission assessments for pods that are tagged.

Finally, an interface (Kube proxy) 244 enables communication between pods. The interface 244 further enables external entities to interact with the applications running on the pods. For instance, if authorized, an entity may interact with application "a1" at a URL assigned to application "a1," via the Internet (not shown) and a load balancer (not shown).

The logging component(s) (128, 130) can collect energy measures from the agents using various collections routes and collections protocols. For example, if given appropriate privileges, the logging component(s) (128, 130) can directly extract energy measures from the agents via the interface 244. In addition, or alternatively, the logging component(s) (128, 130) can collect energy measures from the API server 214 of the master node 114, which, in turn, receives the energy measures from the node managers (Kublets) running on individual nodes. The logging component(s) (128, 130) can proactively pull the energy measures from the agents using any of the above-described routes. Alternatively, or in addition, the container orchestration platform 110 can proactively push the energy measures to any subscribing monitoring mechanism, such as the logging component(s) (128, 130), e.g., on a periodic or on-demand basis.

The architecture and protocols described with respect to FIGS. 1 and 2 can be varied in different ways. For example, in the illustrative protocol described above, the container orchestration platform 110 deploys a monitoring agent on each worker node. Alternatively, the container orchestration platform 110 can selectively deploy agents on only a class of worker nodes of interest, which are identified by the application manifest 106. This mode of operation may reduce energy consumption by eliminating the collection of energy measures from a subset of the worker nodes.

Further, in some implementations, each instance of the agent selectively collects energy measures from only those applications that have been tagged by the application manifest 106. Alternatively, each agent is configured to collect energy measures from every application running on its node, regardless of whether it has been tagged. The logging component(s) (128, 130) thereafter perform a filtering operation by using the tags conveyed by the application manifest 106 to compute carbon emission measures from only application processes of interest that have been tagged. Alternatively, or in addition, each agent can itself perform this filtering operation. More generally, the tags define the criteria used to perform filtering of application processes, but the filtering/discriminating operation itself can be performed at different stages of processing (including an implementation in which it is performed at plural stages). Further, as previously noted, the specific computation of carbon emission measures can be performed by each agent or delegated to the logging component(s) (128, 130).

Further, in the illustrative protocol described above, the application manifest 106 and the agent manifest 238 are two separate manifests. Alternatively, a single manifest can describe both the applications and the agent. Further, in the illustrative protocol described above, the application manifest 106 is the pathway through which the customer tags selected applications. Alternatively, or in addition, the customer can specify the tags in a separate instruction provided to the master node 114. Still other variations are possible.

Figure 3:
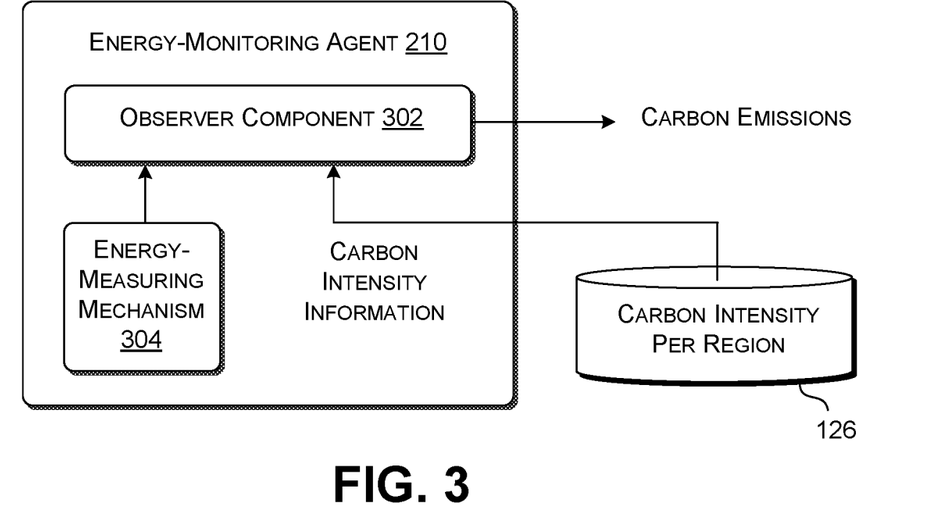
FIG. 3 shows one implementation of an agent, which is one component deployed on a worker node of a cluster within the container orchestration platform of FIG. 2.

FIG. 3 shows one implementation of the agent 210 that runs on worker node W2 (204). The agent 210 includes an observer component 302 that collects an energy measurement from an energy-measuring mechanism 304, such as PowerTOP provided by Intel Corporation of Palo Alto, California (USA). The observer component 302 optionally receives a carbon intensity measure from the data store 126, such as the data store provided by REsurety of Boston, Massachusetts (USA). The observer component 302 can then compute a carbon emission measure for each application that it monitors in the cluster C1 (112), e.g., by multiplying the energy measure by the carbon intensity measure. Alternatively, the observer component 302 only collects energy measures and forwards those measurements to a logging component. The logging component then combines the energy measures with carbon intensity measures to compute the carbon emission measures.

As noted above, the computing system 102 can perform application-level filtering in different ways. In one approach, the agent 210 receives instructions from the master node 114 regarding the applications that the user has tagged via the application manifest or some other mechanism. The agent 210 is then configured to selectively collect energy measures from only tagged processes. Alternatively, the agent 210 can be configured to collect energy measures from all applications running on its node, and can then use application designation information conveyed by the application manifest 106 to selectively compute carbon emission measures for only the tagged application processes. The agent 210 can receive instructions from the master node 114 at any time, such as in an initial configuration operation and/or in on-demand fashion when carbon emission assessments are to be performed. Still alternatively, as noted above, the computing system 102 can rely on the logging component(s) (128, 130) to select and report on only the tagged processes. Yet other implementations are possible.

A customer can likewise perform the tagging itself in different ways. In the specific and non-limiting context of Kubernetes, tags can be defined via labels or annotations. The term "tags" as used herein, however, more generally refers to any way of designating one process from another, and does not necessarily imply the use of any specific protocol or container orchestration technology. Further, a customer can tag application processes on different levels of abstraction in a hierarchy of abstractions. For instance, the customer can tag specific applications or entire classes of applications. In some implementations, the customer can tag a namespace via the application manifest 106, and the agent 210 (and/or higher-level filtering mechanism) will compute carbon emission measures from only application processes associated with the tagged namespace. It is further possible to designate applications by tagging application processes for which carbon emission measures should not be provided. To broadly say that the application manifest 106 uses application designation information to distinguish between processes of interest and processes that are not of interest encompasses many techniques for tagging, e.g., including the case in which the application processes of interest are given tags in the application manifest 106, and the case in which application processes that are not of interest are given tags in the application manifest 106.

Figure 4:
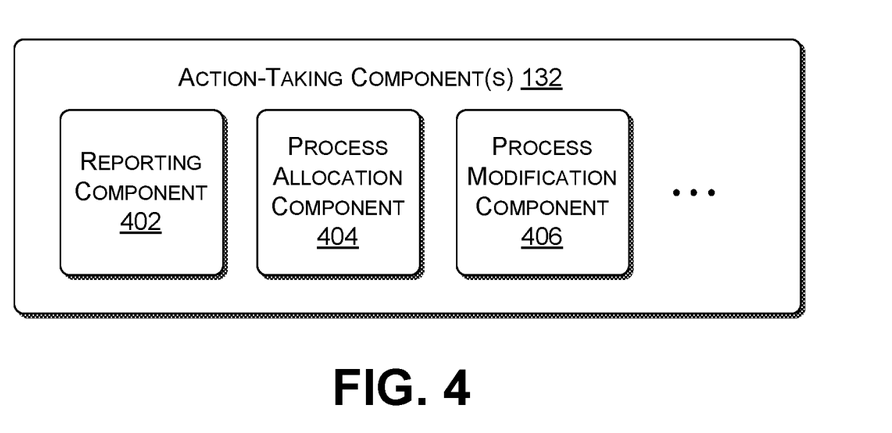
FIG. 4 shows a summary of action-taking component(s) that take one or more actions based on the carbon emission information produced by the computing system of FIG. 1.

FIG. 4 shows additional details of the action-taking component(s) 132, which were introduced in the explanation of FIG. 1. The action-taking component(s) 132 include various subcomponents for taking different actions based on the carbon emission information produced by the computing system 102 of FIG. 1. For instance, the action-taking component(s) 132 include a reporting component 402 for reporting the carbon emission information in tabular form, a graphical form, etc.

A process allocation component 404 determines whether it is appropriate to transfer an application process from one location to another based on various factors, such as the improvement in carbon emissions that would occur upon the transfer, the one-time carbon and other costs incurred by the transfer itself, the feasibility of the transfer, the constraints (if any) placed by the customer and/or applicable jurisdictions on the transfer, and so on. For example, export restrictions may prevent an application process from being run in a particular jurisdiction. Although not shown, the process allocation component 404 can optionally include an optimization component for selecting an allocation of computing processes that will produce the lowest net cost, or an approximation of the lowest net cost. The process allocation component 404 can perform this task by examining each permutation and selecting the permutation that provides the lowest net carbon emissions, or using any type of optimization search algorithm (e.g., a greedy exploration of a hierarchical search space of permutations, a beam search exploration of the hierarchical search space, a, linear programming algorithm, any type of machine-trained model produced based on a training set of historical energy measurements for different running conditions and application operations, etc.).

The processing allocation component 404 can perform the above-described allocation on a dynamic event-driven basis and/or on a periodic basis (with respect to any interval of time between successive allocation operations). For example, the processing allocation component 404 can dynamically and automatically move application processes when a part of the power grid is detected to have failed and/or when the characteristics of energy demand markedly change, which can be assessed with respect to predetermined thresholds. Alternatively, or in addition, the processing allocation component 404 can reallocate application processes on a monthly basis. The computing system 102 can allow each individual customer to choose an allocation strategy that most effectively suits his or her needs. In some cases, a customer may instruct the computing system 102 to only reallocate application processes upon receiving the explicit approval of the customer.

A process modification component 406 changes at least one feature of an application to reduce its carbon emission. For instance, an energy reading for an application that includes plural parts may reveal one particular part is consuming most of the energy that is used to run the application. This application part consequently produces the most carbon emissions. A developer may choose to swap the identified application part with another application part that performs the same function, but with lower energy demands. In other cases, the developer may decrease the number of iterations performed by an application, adjust the resolution of information that is processed, change the time at which information is processed, and so on. The process modification component 406, like the processing allocation component 404, can rely on any optimization algorithm to choose a set of one or more changes that is most impactful in lowering the amount of carbon emitted in the execution of an application. And like the processing allocation component 404, the process modification component 406 can modify application processes on a dynamic demand-driven basis and/or periodic basis. The processing modification component 406 can perform these modifications on an automatic basis, or only upon receiving explicit approval from a customer. For example, the processing modification component 406 can dynamically shut down or throttle an application process that is producing more than a prescribed amount of carbon emissions, with or without the approval of the customer (depending on how the customer configures the computing system 102).

Figure 5:
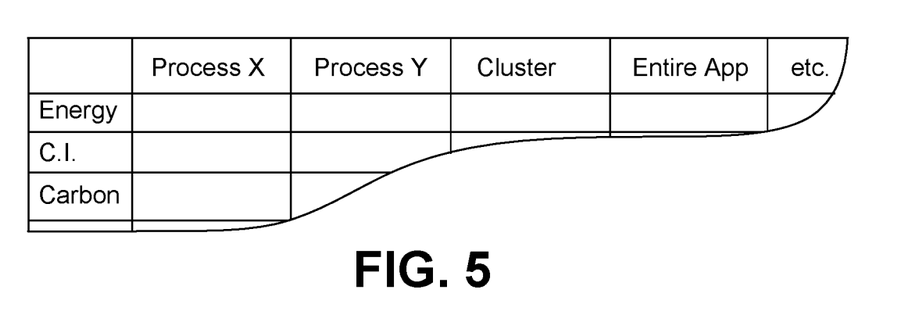
FIG. 5 shows an overview of a presentation that the action-taking component(s) of FIG. 4 can produce.

FIG. 5 shows an example of output information produced by the reporting component 402 of FIG. 4. The output information expresses the energy measures, carbon intensity measures, and carbon emission measures produced by the computing system 102 for individual application processes (e.g., Process X, Process Y, etc.), for the cluster in which the application processes run, for the application as a whole (which may run across plural nodes), and so on. In addition, or alternatively, the reporting component 402 can generate alert notifications for carbon emissions readings that are deemed as anomalous (which can be assessed based on predetermined threshold values). In addition, or alternatively, the reporting component 402 can provide messages that identify the application process(es) that exhibit particularly bad or good carbon emission measures (again, which can be assessed based on predetermined threshold values).

Figure 6:
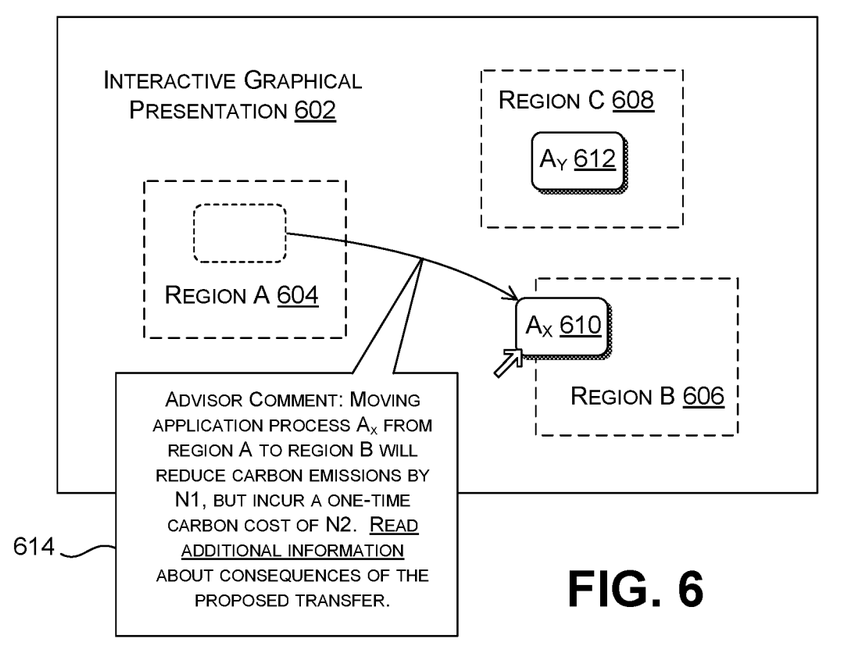
FIG. 6 shows an example of an interactive graphical presentation that the action-taking component(s) of FIG. 4 can produce.

FIG. 6 shows an illustrative interactive graphical presentation 602 produced by the reporting component 402 of FIG. 4. The interactive graphical presentation 602 shows symbols representing different regions (604, 606, 608) and the respective applications running in the regions. For instance, the interactive graphical presentation 602 shows that application $A_x$ 610 is running in region A 604, while application process $A_y$ 612 is running region C 608. The user may move any symbol associated with an application across the interactive graphical presentation 602, from one region to another. In response, the interactive graphical presentation 602 can provide real-time feedback on the consequences of this transfer with respect to carbon emissions and/or any other factor(s). For instance, the interactive graphical presentation 602 presents a pop-up message 614 that explains the cost and benefits of the proposed transfer, with respect to at least the emission of carbon dioxide.

Figure 7:
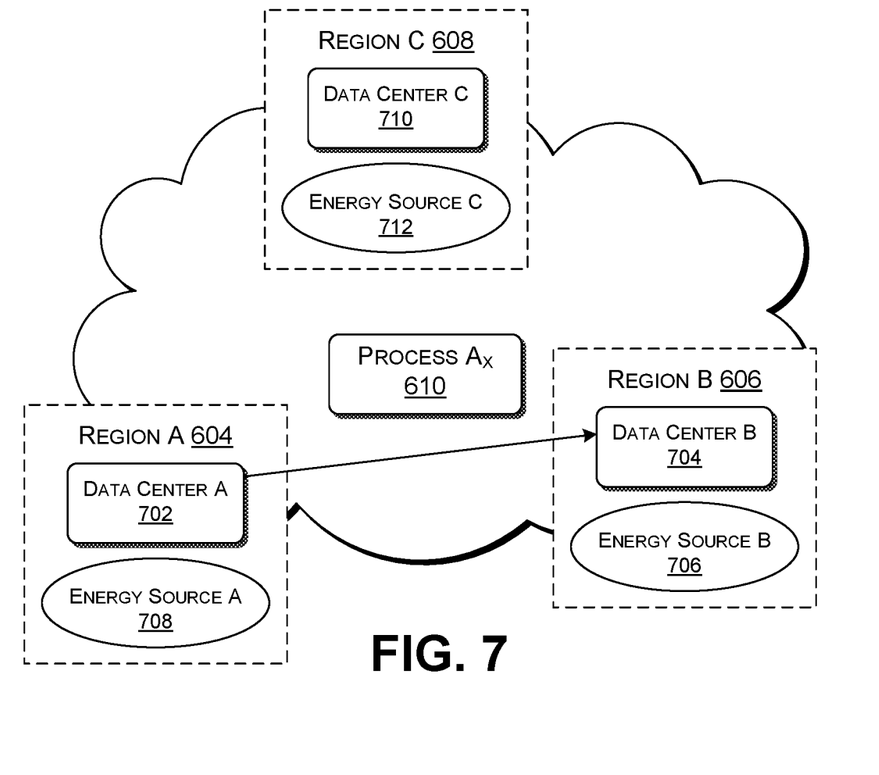
FIG. 7 shows an example of the operation of a process allocation component, which is one of the action-taking component(s) of FIG. 4.

FIG. 7 shows the operation of the process allocation component 404 (of FIG. 4) in moving the application $A_x$ 610 from a first data center 702 in the region A 604 to a second data center 704 in region B 606. The customer or automated algorithm may determine that this transfer is justified because an energy source B 706 in region B 606 has a lower carbon intensity than an energy source A 708 in region A 604. A data center 710 in region C 608 has an energy source 712 that has a carbon footprint that lies between the energy source B 706 and the energy source A 708. The computing system 102 can accomplish the transfer of the application $A_x$ 610 by computer network (e.g., the Internet), by private dedicated computer network, by shipping a machine-readable storage medium that stores the application $A_x$ 610, and so on.

Note that while FIGS. 6 and 7 have been explained in the context of movement of applications among data centers, the principles set forth above more generally apply to the movement of application processes across different computing platforms at different respective locations.

B. Illustrative Processes

Figure 8:
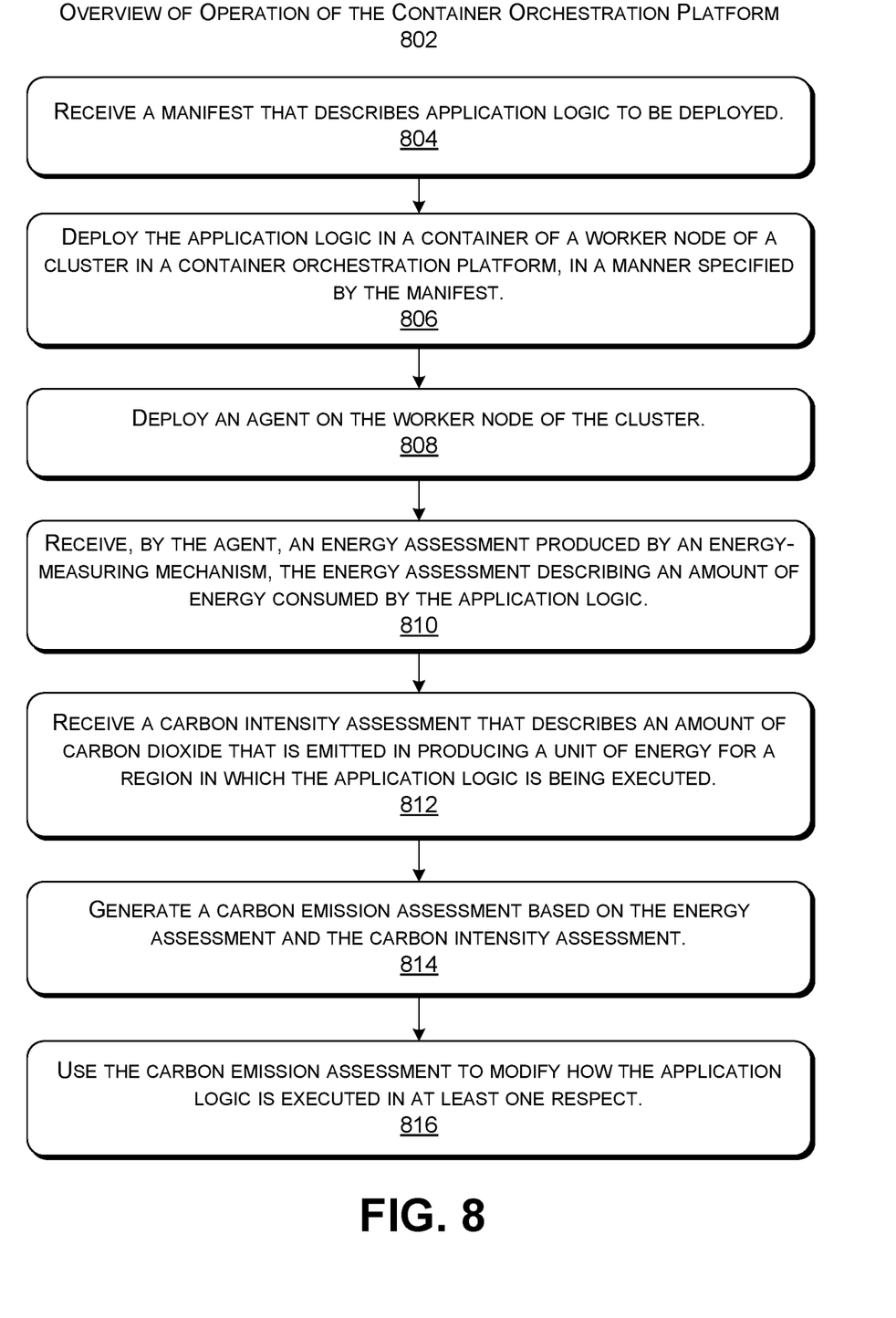
FIG. 8 is a flowchart that shows a process that explains one manner of operation of the computing system of FIG. 1.
Figure 9:
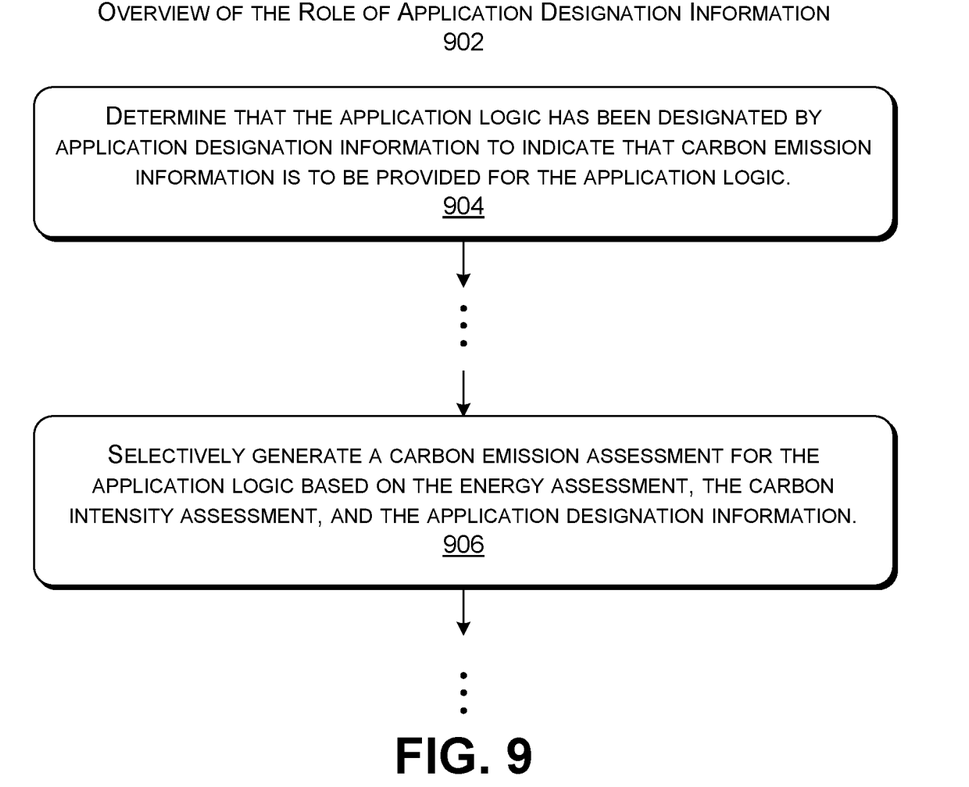
FIG. 9 is a flowchart that describes the role of application designation information in the computing system of FIG. 1.

FIGS. 8 and 9 show processes that explain the operation of the computing system 102 of Section A in flowchart form. Since the principles underlying the operation of the computing system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a configured collection of logic gates.

FIG. 8 shows a process 802, implemented by the computing system 102 of FIG. 1, for monitoring carbon emissions of a computing process. In block 804, the computing system 102 receives an application manifest (e.g., the application manifest 106) that describes application logic (e.g., application "a4" 208) to be deployed. In block 806, the computing system 102 deploys the application logic in a container (e.g., the container 232) of a worker node (e.g., the worker node 204) of a cluster (e.g., the cluster 112) in a container orchestration platform (e.g., the container orchestration platform 110), in a manner specified by the application manifest. In block 808, the computing system deploys an agent (e.g., the agent 210) on the worker node of the cluster. In block 810, the agent of the computing system 102 receives an energy assessment produced by an energy-measuring mechanism (e.g., the energy-measuring mechanism 304), the energy assessment describing an amount of energy consumed by the application logic. In block 812, the computing system receives a carbon intensity assessment that describes an amount of carbon dioxide that is emitted in producing a unit of energy for a region in which the application logic is being executed, e.g., which may be correlated with the amount of energy used to produce a unit of electricity. In block 814, the computing system 102 generates a carbon emission assessment based on the energy assessment and the carbon intensity assessment. In block 816, the computing system 102 uses the carbon emission assessment to modify how the application logic is executed in at least one respect.

FIG. 9 shows a process 902, implemented by the computing system 102, that provides an overview of the role of application designation information. In block 904, the computing system 102 determines that the application logic has been designated by application designation information to indicate that carbon emission information is to be provided for the application logic. A user can supply this application designation information in the application manifest 106 and/or through some other information pathway. Further, a user can supply application designation information in various ways e.g., by using the application manifest 106 to tag application processes of interest or to tag application processes that are not of interest. In block 906, the computing system 102 selectively generates a carbon emission assessment for the application logic based on the energy assessment, the carbon intensity assessment, and the application designation information. The agent may correspond to the entity that performs the selecting, and/or some other entity in the computing system 102 can perform the selecting, such as the logging component(s) (128, 130).

C. Representative Computing Functionality

Figure 10:
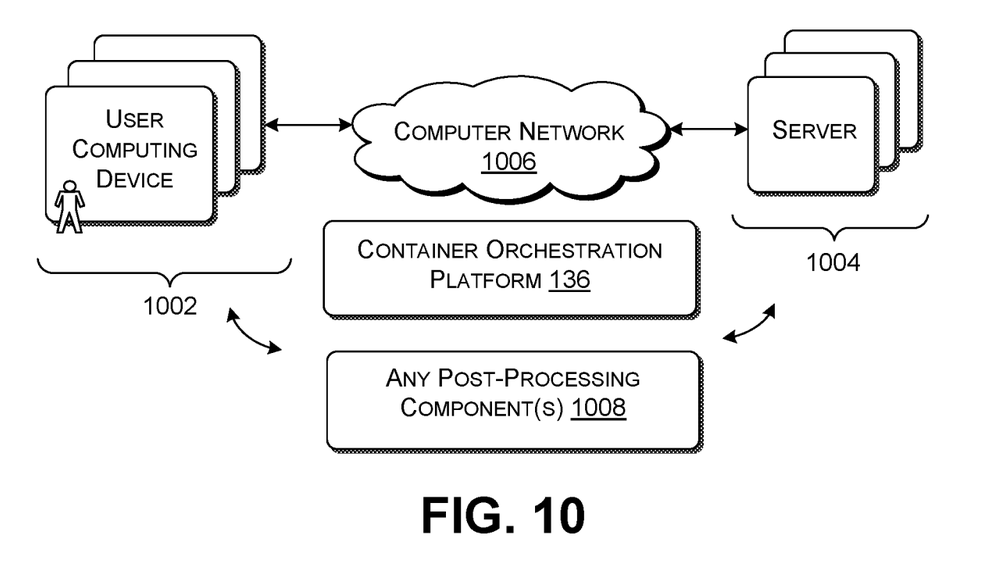
FIG. 10 shows computing equipment that can be used to implement the computing system of FIG. 1.

FIG. 10 shows an example of computing equipment that can be used to implement any of the systems summarized above. The computing equipment includes a set of user computing devices 1002 coupled to a set of servers 1004 via a computer network 1006. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1006 can be implemented as a local area network, a wide area network (e.g., the Internet), one or more point-to-point links, or any combination thereof.

FIG. 10 also indicates that various features of the computing system 102 can be spread across the user computing devices 1002 and/or the servers 1004 in any manner. For instance, in one case, the container orchestration platform 110 and action-taking component(s) 132 are entirely implemented by one or more of the servers 1004. Each user may interact with the action-taking component(s) 132 via a browser application or other programmatic interface provided by a user computing device. In another case, the container orchestration platform 110 is entirely implemented by one or more of the servers, and at least one of the action-taking component(s) 132 is implemented by each user computing device in local fashion. Still other allocations of the logic of the computing system 102 are possible. It is also contemplated that all or parts of the container execution platform 110 can be performed by each user computing device.

Figure 11:
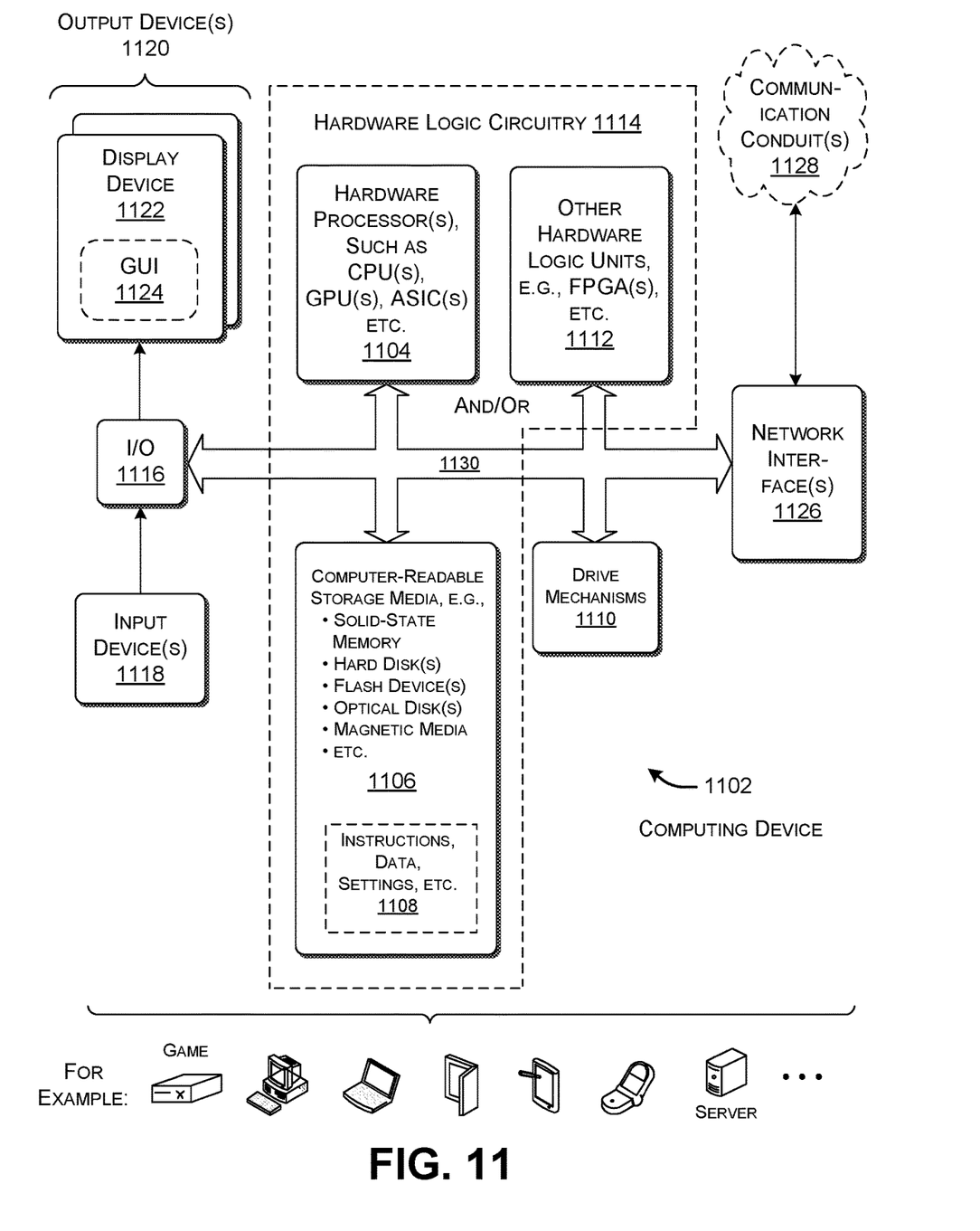
FIG. 11 shows an illustrative type of computing device that can be used to implement any aspect of the features shown in the foregoing drawings.

FIG. 11 shows a computing device 1102 that can be used to implement any aspect of the mechanisms set forth in the above-described figures. For instance, the type of computing device 1102 shown in FIG. 11 can be used to implement any user computing device or any server shown in FIG. 10. In all cases, the computing device 1102 represents a physical and tangible processing mechanism.

The computing device 1102 can include one or more hardware processors 1104. The hardware processor(s) 1104 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing device 1102 can also include computer-readable storage media 1106, corresponding to one or more computer-readable media hardware units. The computer-readable storage media 1106 retains any kind of information 1108, such as machine-readable instructions, settings, data, etc. Without limitation, the computer-readable storage media 1106 may include one or more solid-state devices, one or more magnetic hard disks, one or more optical disks, magnetic tape, and so on. Any instance of the computer-readable storage media 1106 can use any technology for storing and retrieving information. Further, any instance of the computer-readable storage media 1106 may represent a fixed or removable unit of the computing device 1102. Further, any instance of the computer-readable storage media 1106 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing device 1102 can utilize any instance of the computer-readable storage media 1106 in different ways. For example, any instance of the computer-readable storage media 1106 may represent a hardware memory unit (such as Random Access Memory (RAM)) for storing transient information during execution of a program by the computing device 1102, and/or a hardware storage unit (such as a hard disk) for retaining/archiving information on a more permanent basis. In the latter case, the computing device 1102 also includes one or more drive mechanisms 1110 (such as a hard drive mechanism) for storing and retrieving information from an instance of the computer-readable storage media 1106.

The computing device 1102 may perform any of the functions described above when the hardware processor(s) 1104 carry out computer-readable instructions stored in any instance of the computer-readable storage media 1106. For instance, the computing device 1102 may carry out computer-readable instructions to perform each block of the processes described in Section B.

Alternatively, or in addition, the computing device 1102 may rely on one or more other hardware logic units 1112 to perform operations using a task-specific collection of logic gates. For instance, the hardware logic unit(s) 1112 may include a fixed configuration of hardware logic gates, e.g., that are created and set at the time of manufacture, and thereafter unalterable. Alternatively, or in addition, the other hardware logic unit(s) 1112 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 11 generally indicates that hardware logic circuitry 1114 includes any combination of the hardware processor(s) 1104, the computer-readable storage media 1106, and/or the other hardware logic unit(s) 1112. That is, the computing device 1102 can employ any combination of the hardware processor(s) 1104 that execute machine-readable instructions provided in the computer-readable storage media 1106, and/or one or more other hardware logic unit(s) 1112 that perform operations using a fixed and/or programmable collection of hardware logic gates. More generally stated, the hardware logic circuitry 1114 corresponds to one or more hardware logic units of any type(s) that perform operations based on logic stored in and/or otherwise embodied in the hardware logic unit(s). Further, in some contexts, each of the terms "component," "module," "engine," "system," "agent," "mechanism," and "tool" refers to a part of the hardware logic circuitry 1114 that performs a particular function or combination of functions.

In some cases (e.g., in the case in which the computing device 1102 represents a user computing device), the computing device 1102 also includes an input/output interface 1116 for receiving various inputs (via input devices 1118), and for providing various outputs (via output devices 1120). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1122 and an associated graphical user interface presentation (GUI) 1124. The display device 1122 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1102 can also include one or more network interfaces 1126 for exchanging data with other devices via one or more communication conduits 1128. One or more communication buses 1130 communicatively couple the above-described units together.

The communication conduit(s) 1128 can be implemented in any manner, e.g., by a local area computer network, a wide area computer network (e.g., the Internet), point-to-point connections, etc., or any combination thereof. The communication conduit(s) 1128 can include any combination of hardwired links, wireless links, routers, gateway functionality, name servers, etc., governed by any protocol or combination of protocols.

FIG. 11 shows the computing device 1102 as being composed of a discrete collection of separate units. In some cases, the collection of units corresponds to discrete hardware units provided in a computing device chassis having any form factor. FIG. 11 shows illustrative form factors in its bottom portion. In other cases, the computing device 1102 can include a hardware logic unit that integrates the functions of two or more of the units shown in FIG. 1. For instance, the computing device 1102 can include a system on a chip (SoC or SOC), corresponding to an integrated circuit that combines the functions of two or more of the units shown in FIG. 11.

The following summary provides a non-exhaustive set of illustrative examples of the technology set forth herein.

(A1) According to a first aspect, some implementations of the technology described herein include a method (e.g., the process 802), implemented by a computing system (e.g., the computing system 102), for monitoring carbon emissions of a computing process. The method includes receiving (e.g., in block 804) an application manifest (e.g., the application manifest 106) that describes application logic (e.g., application "a4" 208) to be deployed; deploying (e.g., in block 806) the application logic in a container (e.g., the container 232) of a worker node (e.g., the worker node 204) of a cluster (e.g., the cluster 112) in a container orchestration platform (e.g., the container orchestration platform 110), in a manner specified by the application manifest; deploying (e.g., in block 808) an agent (e.g., the agent 210) on the worker node of the cluster; and receiving (e.g., in block 810) an energy assessment produced by an energy-measuring mechanism (e.g., the energy-measuring mechanism 304), the energy assessment describing an amount of energy consumed by the application logic. The method further includes receiving (e.g., in block 812) a carbon intensity assessment that describes an amount of carbon dioxide that is emitted in producing a unit of energy for a region in which the application logic is being executed; generating (e.g., in block 816) a carbon emission assessment based on the energy assessment and the carbon intensity assessment; and using (e.g., in block 816) the carbon emission assessment to modify how the application logic is executed in at least one respect.

According to one characteristic, the method of A1 provides accurate process-level insight into the emission of carbon by a computing process. The information generated by the method empowers a customer to make intelligent decisions regarding how the application is implemented. Further, the method can be applied to many types of applications, including legacy applications, without labor intensive changes to the application code itself.

(A2) According some implementations of the method of A1, the application logic corresponds to an entirety of an application.

(A3) According to some implementations of any of the methods of A1 or A2, the application logic corresponds to one part of an application having plural parts.

(A4) According to some implementations of any of the methods of A1-A3, the worker node is implemented by a virtual machine or a physical machine.

(A5) According to some implementations of any of the methods of A1-A4, the cluster has plural worker nodes and a master node, wherein an instance of the agent is deployed on each of the plural worker nodes.

(A6) According to some implementations of the method of A5, the method further includes receiving another manifest that describes the agent, wherein the agent is deployed on each of the plural worker nodes in response to receiving the other manifest.

(A7) According to some implementations of any of the methods of A1-A6, an instance of the application is run on at least two of the plural worker nodes.

(A8) According to some implementations of the method of A1-A7, the method further includes providing application designation information that specifies that the application logic is logic for which a carbon emission assessment is to be generated, and the method selectively provides the carbon emission assessment for the application logic based on the application designation information.

(A9) According some implementations of the method of A8, the application designation information is specified via information provided in the manifest.

(A10) According to some implementations of the methods of A8 or A9, plural instances of application logic are deployed on the worker node. Further, the agent collects energy assessments from all instances of application logic. Further, the application designation information is used to select all instances of application logic for which carbon emission assessments are to be provided.

(A11) According to some implementations of the method of A10, the agent performs selecting of the instances for which carbon emission assessments are to be provided.

(A12) According to some implementations of the method of A10, a component other the agent performs selecting of the instances for which carbon emission assessments are to be provided.

(A13) According to some implementations of the methods of A8 or A9, plural instances of application logic are deployed on the worker node. Further, the agent uses the application designation information to selectively collect energy assessments from only those instances of application logic that are identified by the application designation information.

(A14) According to some implementations of any of the methods of A1-A13, the operation of using involves moving the application logic from a first location to a second location to reduce the carbon emitted in the execution of the application logic.

(A15) According to some implementations of the method of A14, the operation of moving the application logic includes transmitting the application logic from a first computing platform at the first location to a second computing platform at the second location.

(A16) According to some implementations of any of the methods of A1-A15, the operation of using involves modifying the application logic to reduce the carbon emitted in the execution of the application logic.

(B1) In yet another aspect, some implementations of the technology described herein include a computing system (e.g., computing system 102) that provides a container orchestration platform (e.g., the container orchestration platform 110). The computing system includes: a cluster (e.g., the cluster 112) having a master node (e.g., the master node 114) communicatively coupled to one or more worker nodes (e.g., the worker nodes 202). A particular worker node of the one or more worker nodes includes a container (e.g., the container 232) that includes application logic (e.g., the application "a4" 208), the particular worker node being implemented as a virtual machine or physical machine. The particular worker node also includes a container (e.g., the container 236) that includes an agent (e.g., the agent 210). The agent includes an energy-measuring mechanism (e.g., the energy-measuring mechanism 304) that provides an energy assessment that describes an amount of energy consumed by the application logic. The computing system is configured to provide a carbon emission assessment for the application logic based on the energy assessment and a carbon intensity assessment. The carbon intensity assessment describes an amount of carbon dioxide that is emitted in producing a unit of energy for a region in which the application logic is being executed.

In yet another aspect, some implementations of the technology described herein include another computing system (e.g., the computing system 102) for monitoring carbon emissions of a computing process. The computing system includes hardware logic circuitry (e.g., the hardware logic circuity 1104) that is configured to perform any of the methods described herein (e.g., methods A1-A16).

In yet another aspect, some implementations of the technology described herein include a computer-readable storage medium (e.g., the computer-readable storage media 1106) for storing computer-readable instructions (e.g., the information 1108). One of more hardware processors (e.g., the hardware processors 1104) execute the computer-readable instructions, to perform any of the methods described herein (e.g., methods A1-A16).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 1114 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by one or more computing devices, for monitoring carbon emissions of a computing process, comprising:
    receiving a manifest that describes application logic to be deployed, the application logic being computer code and the manifest being a description of the application logic expressed in a computer language;
    deploying the application logic in a container of a worker node of a cluster of nodes in a container orchestration platform, in a manner specified by the manifest, the container being a software unit that bundles the application code to be run, and the worker node being a virtual machine or a physical machine;
    deploying an agent on the worker node of the cluster, the agent being implemented by software;
    receiving, by the agent, based on instructions in the manifest, an energy assessment produced by an energy-measuring mechanism, the energy assessment describing an amount of energy consumed by the application logic, the energy-measuring mechanism measuring amounts of energy consumed by hardware that implements the application logic;
    receiving a carbon intensity assessment that describes an amount of carbon dioxide that is emitted in producing a unit of energy for a region in which the application logic is being executed;
    generating a carbon emission assessment based on the energy assessment and the carbon intensity assessment; and
    using the carbon emission assessment to modify how the application logic is executed in at least one respect, said using involving modifying the application logic to reduce energy consumption in execution of the application logic and/or moving the application logic from a first location that uses a first energy source to a second location that uses a second energy source, the second energy source having a lower carbon intensity than the first energy source.

2. The method of claim 1, wherein the cluster has plural worker nodes and a master node, and wherein an instance of the agent is deployed on each of the plural worker nodes.

3. The method of claim 2, further including receiving another manifest that describes the agent, and wherein the agent is deployed on each of the plural worker nodes in response to receiving the other manifest.

4. The method of claim 1,
    wherein the method further includes providing application designation information that specifies that the application logic is logic for which a carbon emission assessment is to be generated, and
    wherein the method selectively provides the carbon emission assessment for the application logic based on the application designation information.

5. The method of claim 4, wherein the application designation information is specified via information provided in the manifest.

6. The method of claim 4, wherein plural instances of application logic are deployed on the worker node, and wherein the agent collects energy assessments from all instances of application logic, and wherein the application designation information is used to select all instances of application logic for which carbon emission assessments are to be provided.

7. The method of claim 6, wherein the agent performs selecting of the instances for which carbon emission assessments are to be provided.

8. The method of claim 6, wherein a component other than the agent performs selecting of the instances for which carbon emission assessments are to be provided.

9. The method of claim 4, wherein plural instances of application logic are deployed on the worker node, and wherein the agent uses the application designation information to selectively collect energy assessments from only those instances of application logic that are identified by the application designation information.

10. The method of claim 1, wherein said moving the application logic includes transmitting the application logic from a first computing platform at the first location to a second computing platform at the second location.

11. The method of claim 1, wherein another container in the cluster contains the agent, and wherein a container runtime runs containers of the cluster.

12. The method of claim 11, wherein the agent interacts with the container that contains the application code, the manifest designating instances of application code from which carbon emission information is to be obtained.

13. A computing system, comprising:
an instruction data store for storing computer-readable instructions; and
a processing system for executing the computer-readable instructions in the data store, to perform operations including:
receiving a manifest that describes application logic to be deployed, the application logic being computer code and the manifest being a description of the application logic expressed in a computer language;
deploying the application logic in a container of a worker node of a cluster of nodes in a container orchestration platform, in a manner specified by the manifest, the container being a software unit that bundles the application code to be run, and the worker node being a virtual machine or a physical machine;
deploying an agent on the worker node of the cluster, the agent being implemented by software;
receiving, by the agent, based on instructions in the manifest, an energy assessment produced by an energy-measuring mechanism, the energy assessment describing an amount of energy consumed by the application logic, the energy-measuring mechanism measuring amounts of energy consumed by hardware that implements the application logic;
receiving a carbon intensity assessment that describes an amount of carbon dioxide that is emitted in producing a unit of energy for a region in which the application logic is being executed;
generating a carbon emission assessment based on the energy assessment and the carbon intensity assessment; and
using the carbon emission assessment to modify how the application logic is executed in at least one respect, said using involving modifying the application logic to reduce energy consumption in execution of the application logic and/or moving the application logic from a first location that uses a first energy source to a second location that uses a second energy source, the second energy source having a lower carbon intensity than the first energy source.

14. The computing system of claim 13, wherein the cluster has plural worker nodes and a master node, and wherein an instance of the agent is deployed on each of the plural worker nodes.

15. The computing system of claim 13,
wherein the operations further include providing application designation information that specifies that the application logic is logic for which a carbon emission assessment is to be generated, and
wherein the operations selectively provide the carbon emission assessment for the application logic based on the application designation information.

16. The computing system of claim 15, wherein plural instances of application logic are deployed on the worker node, and wherein the agent collects energy assessments from all instances of application logic, and wherein the application designation information is used to select all instances of application logic for which carbon emission assessments are to be provided.

17. A non-transitory computer-readable storage medium for storing computer-readable instructions, one or more hardware processors executing the computer-readable instructions to perform operations that comprise:
receiving a manifest that describes application logic to be deployed, the application logic being computer code and the manifest being a description of the application logic expressed in a computer language;
deploying the application logic in a container of a worker node of a cluster of nodes in a container orchestration platform, in a manner specified by the manifest, the container being a software unit that bundles the application code to be run, and a worker node being a virtual machine or a physical machine;
deploying an agent on the worker node of the cluster, the agent being implemented by software;
receiving, by the agent, based on instructions in the manifest, an energy assessment produced by an energy-measuring mechanism, the energy assessment describing an amount of energy consumed by the application logic, the energy-measuring mechanism measuring amounts of energy consumed by hardware that implements the application logic;
receiving a carbon intensity assessment that describes an amount of carbon dioxide that is emitted in producing a unit of energy for a region in which the application logic is being executed;
generating a carbon emission assessment based on the energy assessment and the carbon intensity assessment; and
using the carbon emission assessment to modify how the application logic is executed in at least one respect, said using involving modifying the application logic to reduce energy consumption in execution of the application logic and/or moving the application logic from a first location that uses a first energy source to a second location that uses a second energy source, the second energy source having a lower carbon intensity than the first energy source.

* * * * *